United States Patent

Moran et al.

Patent Number: 5,928,610
Date of Patent: Jul. 27, 1999

[54] OXYGEN GENERATOR

[75] Inventors: Michael E. Moran, Williamsville; Joseph M. McMahon, North Tonawanda, both of N.Y.; Shane R. Manning, Newport, Vt.

[73] Assignee: Oxygen Generating Systems, Inc., Niagara Falls, N.Y.

[21] Appl. No.: 09/067,713

[22] Filed: Apr. 28, 1998

[51] Int. Cl.$^6$ .................................................. B01D 53/04
[52] U.S. Cl. ........................... 422/120; 422/4; 422/122; 422/212; 422/213; 422/305; 95/98; 95/105; 95/130; 96/130; 96/143
[58] Field of Search ................................ 422/4, 120, 122, 422/211, 212, 213, 305; 95/96–98, 105, 130; 96/130, 143

[56] References Cited

U.S. PATENT DOCUMENTS

| | | | |
|---|---|---|---|
| 4,552,571 | 11/1985 | Dechene | 96/130 |
| 4,636,226 | 1/1987 | Canfora | 96/130 |
| 4,698,075 | 10/1987 | Dechene | 96/130 |
| 4,869,733 | 9/1989 | Stanford | 96/130 |

*Primary Examiner*—Krisanne Thornton
*Assistant Examiner*—Fariborz Moazzam
*Attorney, Agent, or Firm*—Phillips, Lytle, Hitchcock, Blaine & Huber LLP

[57] ABSTRACT

An improved oxygen generator (20) includes an air compressor (21) having a pressure port (22) and a suction port (23) and being selectively operable to produce a flow of air from the suction port to the pressure port; a molecular sieve (30) having an inlet communicating with the compressor and having an outlet, the sieve being adapted to adsorb nitrogen from a flow of gas passing therethrough; a storage tank (33) communicating with the sieve outlet and adapted to store oxygen-rich gas passing through the sieve; and a control valve (24) operatively arranged between the compressor and the sieve and being selectively movable between a first position in which air flows from the compressor suction port through the sieve to the storage tank and a second position in which oxygen-rich gas flows from the storage tank through the sieve and control valve to desorb nitrogen in the sieve. In use, the inventive apparatus performs a method which includes the steps of: selectively operating the control valve to permit a forward flow of gas from the compressor suction port to the storage tank through the sieve to adsorb nitrogen from the gas and to accumulate oxygen-rich gas in the storage tank; and alternatively operating the control valve to permit a reverse flow of oxygen-rich gas from the storage tank to the compressor pressure port to desorb nitrogen from the molecular sieve.

13 Claims, 3 Drawing Sheets

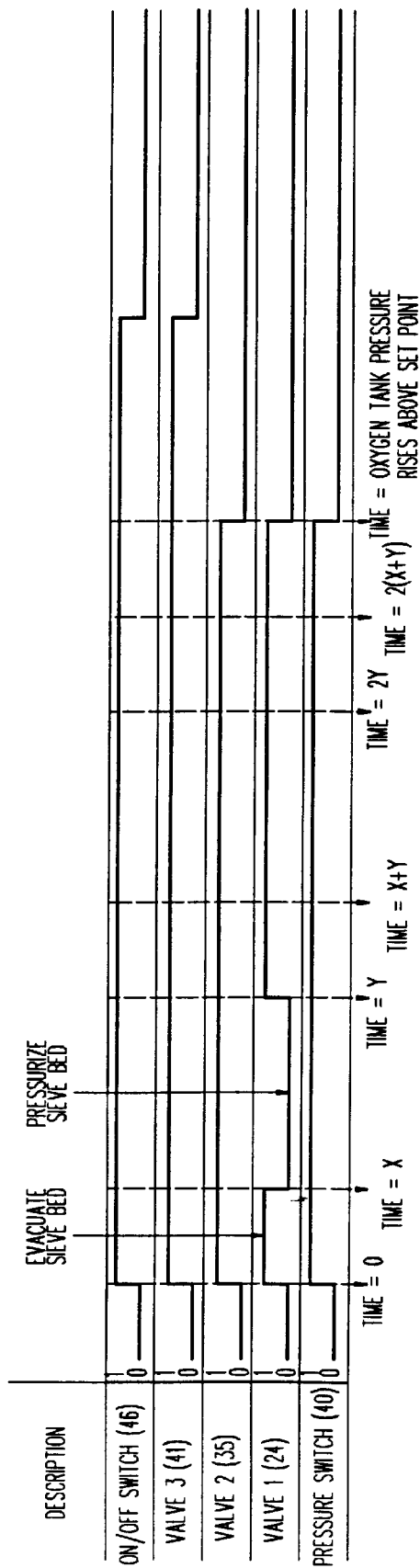

OXYGEN GENERATOR

TECHNICAL FIELD

The present invention relates generally to the field of oxygen generators, and, more particularly, to an improved intermittently-operated single-bed vacuum/pressure swing adsorption (VPSA) oxygen generator that is particularly adapted to provide oxygen to water coolers, hot tubs, furnaces, septic systems and the like.

BACKGROUND ART

Heretofore, oxygen has been generated commercially by fractionalization and cryogenic processes, and then stored in cylinders that are delivered to end users. More recently, however, oxygen generators have been used to produce on-site oxygen, as an alternative to the supply of storage cylinders. Depending on usage, such oxygen generators may provide oxygen at a lower cost then that afforded by the cylinders.

Air is about 21% oxygen and about 78% nitrogen. It is known that an appropriate molecular sieve (e.g., containing zeolite or equivalent) will selectively adsorb nitrogen from a flow of air passing therethrough. The result is a flow of oxygen-rich gas. Thus, pressure swing adsorption-type oxygen generators have been developed to provide a continuous flow of compressed air through a zeolite bed to adsorb nitrogen from the gas and to provide an oxygen-rich fluid stream. Typically, the apparatus contains two zeolite beds, such that one may be desorbed of its accumulated nitrogen by a reverse flow, while the other is providing an oxygen-rich gas in a forward flow.

However, there are some applications that require a smaller amount of oxygen. For example, it has been proposed to enhance water coolers by providing a flow of oxygen to the chilled water. In addition to this, application such as hot tubs, furnaces and the like may require a lower flow of oxygen.

DISCLOSURE OF THE INVENTION

With parenthetical reference to the corresponding parts, portions or surfaces of the disclosed embodiment, merely for purposes of illustration and not by way of limitation, the present invention broadly provides an improved oxygen generator of the single-bed vacuum/pressure swing adsorption type. The improved oxygen generator broadly includes: an air compressor having a pressure port and a suction port, and being selectively operable to direct a flow of air from the pressure port or to draw a vacuum into the suction port; a molecular sieve having an inlet communicating with the compressor and having an outlet, the sieve being adapted to adsorb nitrogen from a flow of gas passing therethrough; a storage tank communicating with the sieve outlet and adapted to store oxygen-rich gas passing through the sieve; and a control valve operatively arranged between the compressor and the sieve and being selectively movable between a first position in which air flows from the compressor pressure port through the sieve to the storage tank, and a second position in which nitrogen is drawn from the sieve bed and a small amount of oxygen-rich gas flows from the storage tank through the sieve and control valve to assist in regenerating the molecular sieve for the next oxygen production cycle.

One unique feature of the invention is that the intermittent operation of the device is controlled by a single control valve. The molecular sieve typically contains zeolite, although other types of adsorbents may be used. The storage tank typically has valves on its inlet and outlet such that it may be prevented from becoming totally depleted of oxygen. To this end, a pressure regulator may enable an outlet flow of oxygen from the tank only when the downstream pressure falls below a predetermined pressure, such as 1 psig. This functions to retain a quantity of oxygen in the tank, and this positive pressure differential serves to prevent contamination of the storage tank. The forward flow of gas from the compressor to the storage tank is through a one-way check valve. The reverse flow from the tank to the compressor is through another one-way check valve and a flow-restricting orifice. The forward and reverse flows may be selectively enabled and disabled as a function of time. If desired, the outlet may have an oxygen filter to remove argon and other contaminants from the flow of oxygen therethrough.

Accordingly, the general object of the invention is to provide an improved oxygen generator.

Another object is to provide a low-flow single-bed vacuum/pressure swing adsorption-type oxygen generator.

Still another object is to provide a low cost and inexpensive apparatus for providing a low flow of oxygen, such as to a water cooler, a hot tub, a furnace, a septic system, and the like.

These and other objects and advantages will become apparent from the foregoing and ongoing written specification, the drawings, and the appended claims.

BRIEF DESCRIPTION OF THE DRAWINGS

FIG. 3 is a view showing the operational sequence of the various valves and switches as a function of time.

DESCRIPTION OF THE PREFERRED EMBODIMENTS

Figure 1:
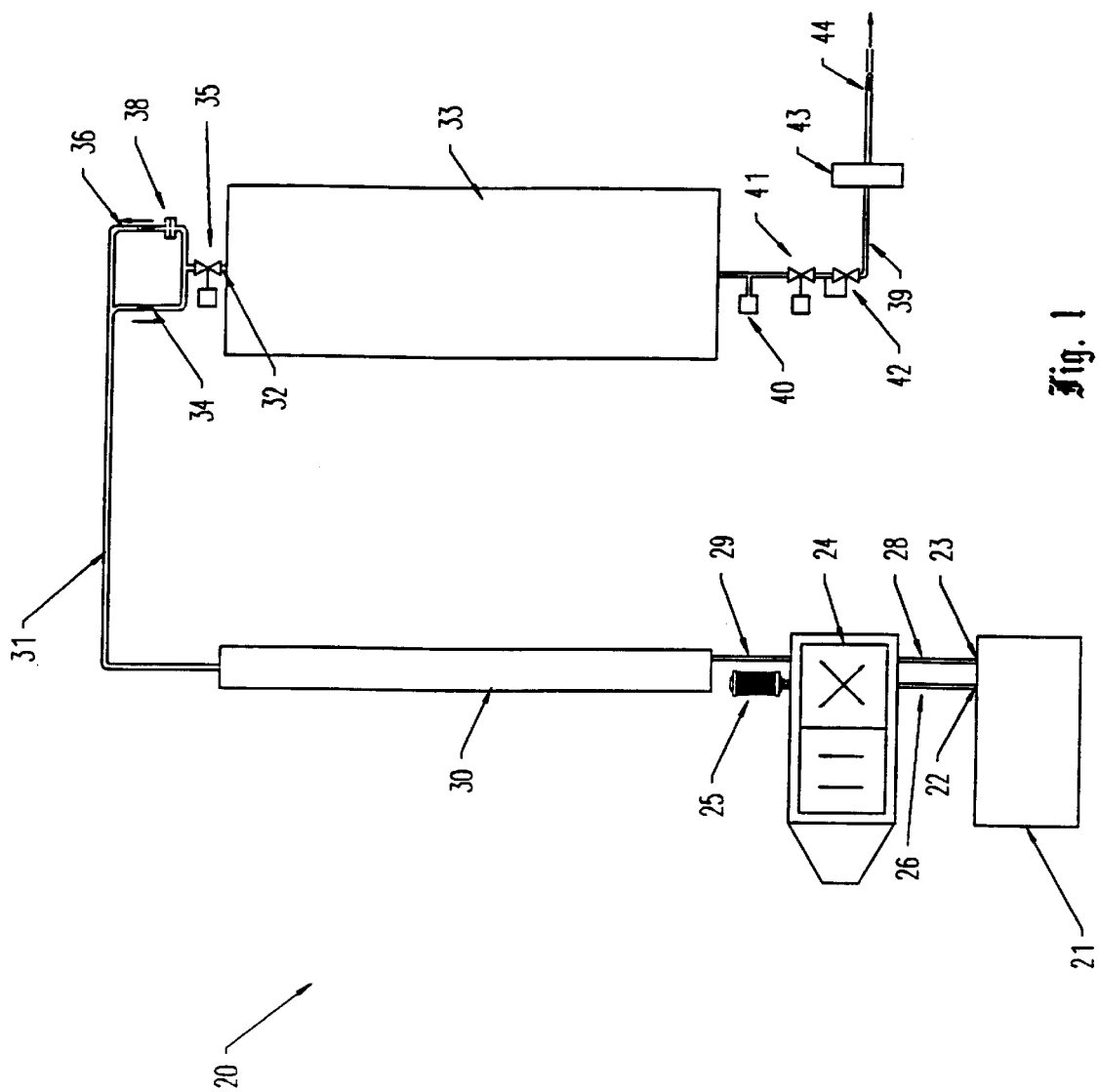
FIG. 1 is a schematic view of a preferred form of the improved apparatus, this view showing the air compressor, the control valve, the molecular sieve, the storage tank, and the various valves and switches associated with the tank.

At the outset, it should be clearly understood that like reference numerals are intended to identify the same structural elements, portions, or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up", and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis or elongation, or axis of rotation, as appropriate.

Turning now to the drawings, and, more particularly, to FIG. 1 thereof, the present invention provides an improved oxygen generator, of which a presently-preferred form is generally indicated at 20. The improved apparatus is shown as broadly including an air compressor 21 having a section port 22 and a pressure port 23, and a four-way solenoid-operated control valve, generally indicated at 24. Valve 24 is shown as having a filter 25 associated with its inlet. This filter also functions as a noise muffler during reverse operation of the device.

Valve 24 is connected via conduits 26, 28 to the suction and pressure ports 22, 23, respectively, of the air compressor. Another conduit 29 communicates the control valve with a molecular sieve, generally indicated at 30. This sieve is shown as being a vertically-elongated hollow tube filled with an active sieve material, such as zeolite or equivalent. This material functions to adsorb nitrogen from a flow of gas passing therethrough. The sieve has an outlet conduit 31 which communicates with the inlet 32 of an oxygen storage tank 33 via a one-way check valve 34 and a two-way solenoid valve 35. Another branch conduit, containing check valve 36 and flow restricting orifice 38, is arranged in parallel with check valve 34. Thus, during forward flow (i.e., from the compressor to the tank) compressed air flows through the molecular sieve bed, where the nitrogen is adsorbed, and the flow of oxygen-rich gas in conduit 31 flows through check valve 34 and solenoid valve 35 to enter oxygen storage tank 33. During reverse operation, oxygen-rich gas from storage tank 33 flows through solenoid valve 35, restricted orifice 38 and check valve 36 back through the molecular sieve and vents through the control valve via muffler/filter 25. The four-way solenoid valve 24 having been deactivated now causes the air compressor to act as a suction pump drawing the pressure in the molecular sieve down to a sub-atmospheric (vacuum) level and extracting the remaining nitrogen in the sieve bed along with some oxygen that is being used as purge gas through the control valve and out of the system via muffler/filter 25. This reverse flow is used to desorb nitrogen accumulated on the bed and to regenerate the molecular sieve for the next production cycle.

The oxygen storage tank is shown as having an outlet conduit 39 which sequentially contains a pressure switch 40, a two-way solenoid valve 41, a pressure regulator 42, an oxygen filter 43, and a one-way check valve 44. The outlet end of this outlet conduit may be connected to a suitable serviced device, such as a water cooler, a hot tub, a furnace, septic system or the like.

During normal operation, valves 35 and 41 are both open to enable a forward and/or reverse flow of oxygen from the storage tank. The normal intermittent operation is controlled by the pressure switch 40 which has internal electrical contacts that open and close as the level of oxygen pressure changes in the oxygen storage tank. The pressure switch 40 functions to close inlet valve 35, to stop the operation of air compressor 21 and timer 45, and to deactivate the four-way solenoid valve 24 when the pressure in the oxygen storage tank rises above a fixed set point. This insures that the pressurized contents of the oxygen storage tank are not exhausted out through the sieve bed 30 and muffler/filter 25 while the machine is not producing oxygen. At the same time, oxygen is still available in the oxygen storage tank to supply the intermittent demands of the application. When the pressure in the oxygen storage tank falls to some other lower preset value, pressure switch 40 closes to allow the normal oxygen production process to continue.

Figure 2:
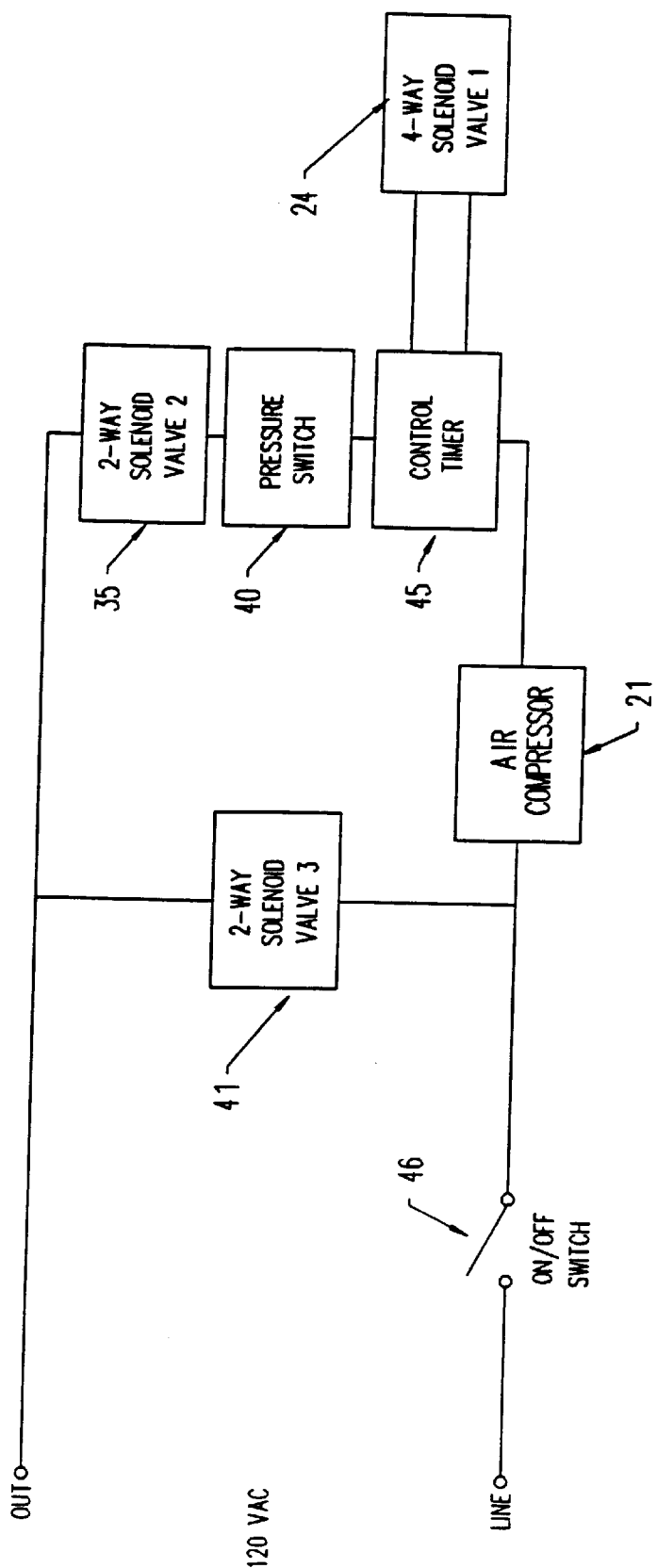
FIG. 2 is an electrical schematic of the apparatus shown in FIG. 1.

Referring now to FIG. 2, an electrical schematic of the apparatus is shown as including valves 41, 35 and 24, pressure switch 40, air compressor 21, as well as a control timer 45 and an on/off switch 46. These components are connected to a source to power, indicated as being 120 VAC. When switch 46 is closed, power is provided to valve 41 through a first branch circuit. At the same time, power is provided to valve 35, pressure switch 40 and control timer 45 through a second branch circuit which is arranged in parallel with valve 41. Control timer 45 controls the operation of valve 24 as a function of time. Thus, when switch 46 is closed, solenoid valve 41 opens to permit a flow of gas from the tank to the serviced device. Pressure switch 40 senses the pressure in the tank outlet, and closes whenever the pressure is less than a predetermined pressure, such as 18 psig. In other words, when the tank is full of oxygen-rich gas at, say, 18 psig, and there is little or no demand for oxygen from the tank, the pressure switch will open to disable control timer 45, valve 35 and air compressor 21. Hence, the apparatus will remain in a standby condition until such time as a demand for oxygen-rich gas causes the pressure in tank 33 to fall below the set point. When this happens, switch 40 closes to energize the second branch conduit containing valve 35 and timer 45.

The operational sequence of the improved device is graphically illustrated in FIG. 3. In FIG. 3, the operation of switches 40 and 46, and valves 24, 35 and 41 are illustrated graphically as a function of time (the abscissa). At time t=0, switch 46 is closed. This opens valve 41, as indicated by the change of state from "0" to "1" for the same length of time that switch 46 has closed. Thus, the outlet solenoid valve opens to permit an outlet flow of oxygen-rich gas from the tank, as there may be a demand for such gas.

In FIG. 3, pressure switch 40 is shown as closing at time t=0 and as remaining closed for the remainder of the operational cycle. This presumes that the pressure in tank 33 is less than the maximum pressure, and that it is desired to operate the apparatus so as to build up the pressure in the tank. Notice that valve 35 opens, as indicated by the change of state, when pressure switch 40 closes. This enables the forward and reverse flow during operation through valve 35. Thereafter, valve 1 is shown as going through a series of alternative operative steps. From time t=0 to t=X, the control valve is shown as being in the position shown in FIG. 1 to enable a reverse flow from the tank through the sieve to be vented through the muffler. Thereafter, from time t=X to time t=Y, control valve 24 is operated to its alternative position to enable a forward flow of compressed air from the compressor to the bed. Notice that the time of the forward flow occupies X–Y seconds, whereas the time of the reverse flow occupies X seconds, a much shorter period of time. Hence, there is a rachet-like effect where the time of the forward flow exceeds the 25 time of the reverse flow. Moreover, the volume of the reverse flow is reduced because of the presence of flow restricting orifice 38. This prevents the tank from simply becoming exhausted during the reverse operation. The alternative operation continues during the operational cycle. Thus, from time t=Y to time t=X+Y, the sieve bed is shown as being desorbed by a reverse flow. From time t=X+Y to time t=2Y, the forward flow serves to replenish and fill the oxygen in the storage tank.

Thus, the inventive oxygen generator operates to alternatively adsorb and desorb nitrogen from a molecular sieve bed, with the forward flow being greater than the desorbing flow. The principal object of the invention is to provide a low-cost oxygen generator for applications such as water cooler, septic systems, hot tubs, and the like.

Modifications

The present invention contemplates that many changes and modifications may be made. The air compressor may be operated electrically on demand. The various conduits may be formed of plastic tubing. Alternatively, conventional stainless steel may be used. Valve 24 is typically a four-way electrically-operated solenoid valve. However, this may be of low cost design, depending upon the end use desired. The air intake filter 25 also doubles as a noise muffler during reverse flow. The molecular sieve bed is individually "old" and is not separately claimed. The adsorbent material within the bed may typically be zeolite, although other types of adsorbent materials may be used. Flow restricting orifice 38 is used to reduce the reverse flow during the desorbing step. The oxygen storage tank may be made of various materials, and may be shaped as desired. Pressure switch 40 may control the operation of valve 35, timer 45 and compressor 21, as desired. Oxygen filter 43 is provided to remove particulate matter from the flow of gas. Check valve 45 is provided to prevent a reverse flow of air into the tank outlet conduit that might otherwise contaminate the tank.

Therefore, while the presently-preferred form of the improved oxygen generator has been shown and described, and several modifications thereof discussed, persons skilled in this art will readily appreciate that various changes and modifications may be made without departing from the spirit of the invention, as defined and differentiated by the following claims.

What is claimed is:

1. An oxygen generator, comprising:

an air compressor having a pressure port and a suction port, and being selectively operable to produce a flow of air from said suction port to said pressure port;

a molecular sieve having an inlet communicating with said compressor and having an outlet, said sieve being operatively arranged to adsorb nitrogen from a flow of gas passing therethrough;

a storage tank communicating with said sieve outlet and operatively arranged to store oxygen-rich gas passing through said sieve; and a control valve operatively arranged between said compressor and said sieve and being selectively movable between a first position in which air flows from said compressor suction port through said control valve and sieve to said storage tank, and a second position in which oxygen-rich gas flows from said storage tank through said sieve and control valve to said compressor pressure port to desorb nitrogen in said sieve.

2. An oxygen generator as set forth in claim 1 wherein said compressor is operated on demand.

3. An oxygen generator as set forth in claim 1 wherein said control valve is a four-way solenoid valve.

4. An oxygen generator as set forth in claim 1 and further comprising a filter connected to said compressor suction port, and wherein said filter functions as a noise muffler when said control valve is in said second position.

5. An oxygen generator as set forth in claim 1 wherein said molecular sieve contains zeolite.

6. An oxygen generator as set forth in claim 1 wherein said storage tank has an inlet port and an outlet port, and further comprising an inlet valve associated with said inlet port and an outlet valve associated with said outlet port.

7. An oxygen generator as set forth in claim 6 and further comprising a first check valve operatively arranged between said molecular sieve and said storage tank inlet valve.

8. An oxygen generator as set forth in claim 7 and further comprising a second check valve and a restricted orifice arranged between said molecular sieve and said storage tank inlet valve.

9. An oxygen generator as set forth in claim 8 wherein said second check valve and said restricted orifice are arranged in parallel with said first check valve such that said gas may flow from said molecular sieve to said storage tank through said first check valve and may flow from said storage tank to said molecular sieve through said second check valve and said restricted orifice.

10. An oxygen generator as set forth in claim 6 and further comprising a pressure regulator associated with said storage tank outlet for permitting a flow of oxygen-rich gas from said storage tank through said tank outlet when the pressure in said storage tank is below above a predetermined set point.

11. An oxygen generator as set forth in claim 6 and further comprising an oxygen filter associated with said storage tank outlet.

12. An oxygen generator as set forth in claim 1 wherein said control valve is operated as a function of time.

13. A method of generating oxygen from apparatus having an air compressor having a pressure port and a suction port, a molecular sieve, a storage tank and a control valve, comprising the steps of:

selectively operating said control valve to permit a forward flow of gas from said compressor suction port through said control valve and said molecular sieve to said storage tank to adsorb nitrogen from said gas and to accumulate oxygen-rich gas in said storage tank; and alternatively operating said control valve to permit a reverse flow of oxygen-rich gas from said storage tank through said molecular sieve and said control valve to said compressor suction port to desorb nitrogen from said molecular sieve.

* * * * *